US009630714B1

(12) United States Patent
Gohl et al.

(10) Patent No.: US 9,630,714 B1
(45) Date of Patent: Apr. 25, 2017

(54) SYSTEMS AND METHODS FOR PROVIDING FLIGHT CONTROL FOR AN UNMANNED AERIAL VEHICLE BASED ON TILTED OPTICAL ELEMENTS

(71) Applicant: GOPRO, INC., San Mateo, CA (US)

(72) Inventors: Pascal Gohl, Zurich (CH); Sammy Omari, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/987,667

(22) Filed: Jan. 4, 2016

(51) Int. Cl.
| B64C 39/02 | (2006.01) |
| G05D 1/10 | (2006.01) |
| G06T 7/00 | (2006.01) |
| H04N 5/225 | (2006.01) |
| H04N 5/247 | (2006.01) |
| B64C 27/08 | (2006.01) |

(52) U.S. Cl.
CPC ............ B64C 39/024 (2013.01); B64C 27/08 (2013.01); G05D 1/101 (2013.01); G06T 7/0065 (2013.01); H04N 5/2252 (2013.01); H04N 5/247 (2013.01); *B64C 2201/024* (2013.01); *B64C 2201/123* (2013.01); *G06T 2207/10032* (2013.01); *G06T 2207/30261* (2013.01)

(58) Field of Classification Search
CPC ...... B64C 39/024; B64C 27/08; G05D 1/101; G06T 7/0065; H04N 5/2252; H04N 5/247
USPC ............................................................ 701/3
See application file for complete search history.

(56) References Cited

U.S. PATENT DOCUMENTS

| 2010/0250022 | A1 | 9/2010 | Hines | |
| 2015/0304532 | A1* | 10/2015 | Bart | H04N 5/2252 |
| | | | | 348/373 |
| 2015/0336015 | A1 | 11/2015 | Blum | |
| 2015/0350614 | A1 | 12/2015 | Meier | |
| 2015/0363648 | A1 | 12/2015 | Li | |
| 2015/0367958 | A1* | 12/2015 | Lapstun | B64D 47/08 |
| | | | | 348/144 |
| 2015/0370250 | A1 | 12/2015 | Bachrach | |
| 2016/0018822 | A1 | 1/2016 | Nevdahs | |
| 2016/0031559 | A1 | 2/2016 | Zang | |
| 2016/0054737 | A1 | 2/2016 | Soll | |
| 2016/0076892 | A1* | 3/2016 | Zhou | B64C 39/024 |
| | | | | 701/3 |
| 2016/0129999 | A1 | 5/2016 | Mays | |
| 2016/0139596 | A1 | 5/2016 | Na | |
| 2016/0179096 | A1 | 6/2016 | Bradlow | |
| 2016/0295108 | A1* | 10/2016 | Cao | H04N 5/23238 |

(Continued)

*Primary Examiner* — Yazan Soofi
(74) *Attorney, Agent, or Firm* — Sheppard Mullin Richter & Hampton LLP

(57) ABSTRACT

This disclosure relates to providing flight control for an unmanned aerial vehicle based on tilted optical elements. The UAV may include a housing, a motor, a first image sensor, a second image sensor, a first optical element having a first field of view, a second optical element having a second field of view, and one or more processors. The first optical element and the second optical element may be carried by the housing such that the vertical fields of view above the midline plane of the housing are greater than the vertical fields of view below the midline plane of the housing when the UAV is tilted during flight, and such that portions of the fields of view overlap. Flight control for the UAV may be provided based on parallax disparity of an object within the overlapping fields of view.

18 Claims, 3 Drawing Sheets

(56) References Cited

U.S. PATENT DOCUMENTS

2016/0304198 A1 10/2016 Jourdan
2016/0306351 A1 10/2016 Fisher
2016/0327950 A1 11/2016 Bachrach
2016/0336020 A1 11/2016 Bradlow

* cited by examiner

SYSTEMS AND METHODS FOR PROVIDING FLIGHT CONTROL FOR AN UNMANNED AERIAL VEHICLE BASED ON TILTED OPTICAL ELEMENTS

FIELD

This disclosure relates to systems and methods for providing flight control for an unmanned aerial vehicle based on parallax disparity.

BACKGROUND

It is known that unmanned aerial vehicles, or UAVs, may be equipped with a pair of optical elements that guide light to image sensors, and that images of an object captured by the image sensors may be used to determine parallax disparity of the object. In such UAVs, the optical elements are mounted on the UAVs and face forward when the UAVs operate leveled with respect to ground. When the UAVs tilt during flight, the optical elements also tilt with the UAVs. For example, when the UAVs are moving forward, the UAVs tilt downwards, and the optical elements, and their fields of view, also tilt downwards. Such tilting may cause the fields of view of the optical elements to include little or no view of the path in front of the UAV.

SUMMARY

The disclosure relates to providing flight control for an unmanned aerial vehicle based on tilted optical elements. First optical element, having a first field of view, and a second optical element, having a second field of view, may be carried by a housing of the UAV. The housing of the UAV may have a midline plane that runs through a middle of the housing. The first optical element and the second optical element may be carried by the housing such that the vertical fields of view of the first field of view and the second field of view above the midline plane of the housing are greater than the vertical fields of view below the midline plane of the housing when the UAV is tilted during flight, and such that a portion of the first field of view overlaps with a portion of the second field of view. Parallax disparity of an object within the overlapping fields of view may be determined and flight control for the UAV may be provided based on the parallax disparity.

A UAV may include one or more of an housing, a motor, a first image sensor, a second image sensor, a first optical element, a second optical element, one or more processors, and/or other components. The housing may have a midline plane that runs through a middle of the housing. The midline plane may be horizontal when the UAV operates leveled with respect to ground. The midline plane may be tilted when the UAV is tilted during flight. The tilt of the midline plane may be the tilt of the UAV. The motor may be carried by the housing and may be configured to drive a rotor. The rotor may provide thrust to move the UAV in any direction.

The first image sensor may be carried within the housing and may be configured to generate a first output signal conveying first visual information based on light that becomes incident thereon. The second image sensor may be carried within the housing and may be configured to generate a second output signal conveying second visual information based on light that becomes incident thereon. The visual information may include, by way of non-limiting example, one or more of an image, a video, and/or other visual information.

In some implementations, the first image sensor may include one or more of a charge-coupled device sensor, an active pixel sensor, a complementary metal-oxide semiconductor sensor, an N-type metal-oxide-semiconductor sensor, and/or other image sensors. In some implementations, the second image sensor may include one or more of a charge-coupled device sensor, an active pixel sensor, a complementary metal-oxide semiconductor sensor, an N-type metal-oxide-semiconductor sensor, and/or other image sensors.

The first optical element may be configured to guide light within a first field of view to the first image sensor. The first optical element may be carried by the housing such that the vertical field of view of the first field of view above the midline plane of the housing is greater than the vertical field of view of the first field of view below the midline plane of the housing when the UAV is tilted during flight.

The second optical element may be configured to guide light within a second field of view to the second image sensor. The second optical element may be carried by the housing such that the vertical field of view of the second field of view above the midline plane of the housing is greater than the vertical field of view of the second field of view below the midline plane of the housing when the UAV is tilted during flight, and such that a portion of the first field of view and a portion of the second field of view overlap.

In some implementations, the first optical element and the second optical element may be affixed to the housing. In some implementations, the UAV may include an active rotation mechanism. The active rotation mechanism may be configured to tilt the first optical element and the second optical element.

In some implementations, the first optical element may include one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens, a perspective control lens, and/or other optical elements. In some implementations, the second optical element may include one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens, a perspective control lens, and/or other optical elements.

The one or more processors may be carried by the housing. The one or more processors may be configured by machine readable instructions to receive the first output signal and the second output signal. The one or more processors may be configured by machine readable instructions to determine a disparity of an object within the portion of the first field of view and the portion of the second field of view that overlap. In some implementations, the one or more processors may be configured to operate the active rotation mechanism to tilt the first optical element and the second optical element based on the tilt of the UAV during flight.

The one or more processors may be configured by machine readable instructions to provide flight control for the UAV based on the disparity. In some implementations, providing flight control for the UAV based on the disparity may include operating the UAV to maintain a minimum distance between the object and/or a maximum distance from the object. In some implementations, providing flight control for the UAV based on the disparity may include operating the UAV to maintain a minimum speed and/or a maximum speed. In some implementations, providing flight control for the UAV based on the disparity may include operating the UAV to avoid the object.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

An unmanned aerial vehicle may be referred to as UAV. The term "unmanned" refers to the capability of the aerial vehicle to operate without requiring a human operator during a flight. In other words, at least some portion of the flight control may be provided remotely and/or by an autopilot. In some implementations, a UAV may carry passengers, cargo, sensors, and/or other physical objects. In some implementations, a UAV may operate autonomously. Alternatively, and/or simultaneously, in some implementations, at least some functionality of a UAV may be controlled and/or modified through remote control, e.g. by a person, for at least some portion of a flight. For example, a human may control and/or assist remotely in a particular maneuver, such as a take-off or landing.

A UAV may be a fixed wing aircraft, a helicopter, a multi-rotor aircraft (e.g. a quadcopter), a rotary wing aircraft, and/or another type of aircraft. In some implementations, a UAV may combine features of multiple types of aircraft. A UAV may include one or more components configured to provide thrust. By way of non-limiting example, the one or more components providing thrust may include one or more wings, airfoils, motors, propellers, rotors, rotor discs, and/or other components.

Figure 1A:
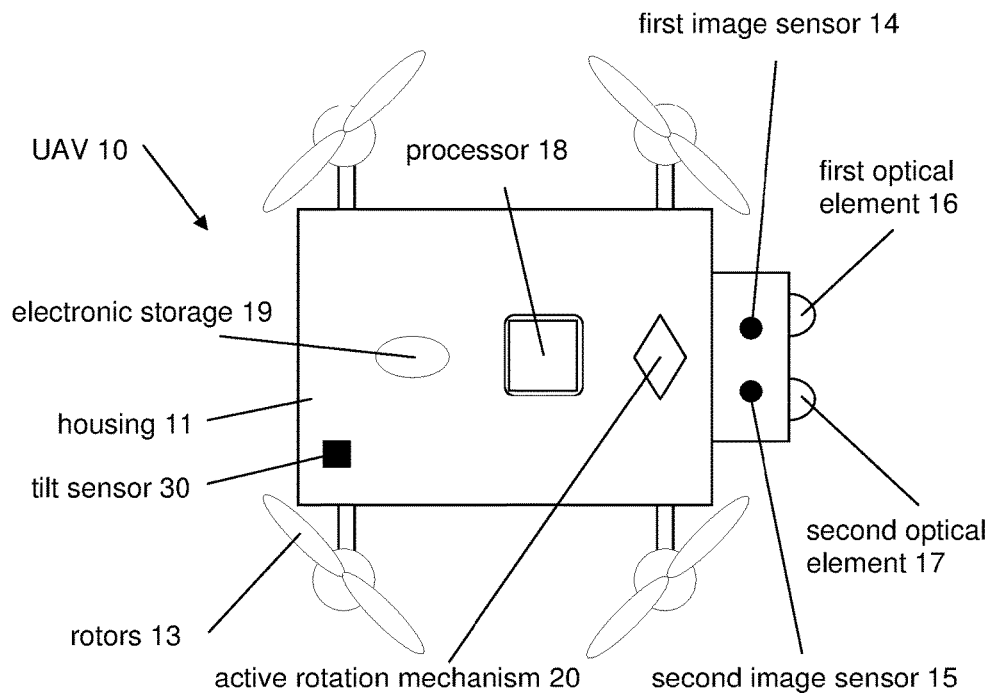
FIG. 1A schematically illustrates a top-down view of an unmanned aerial vehicle in accordance with one or more implementations.
Figure 1B:
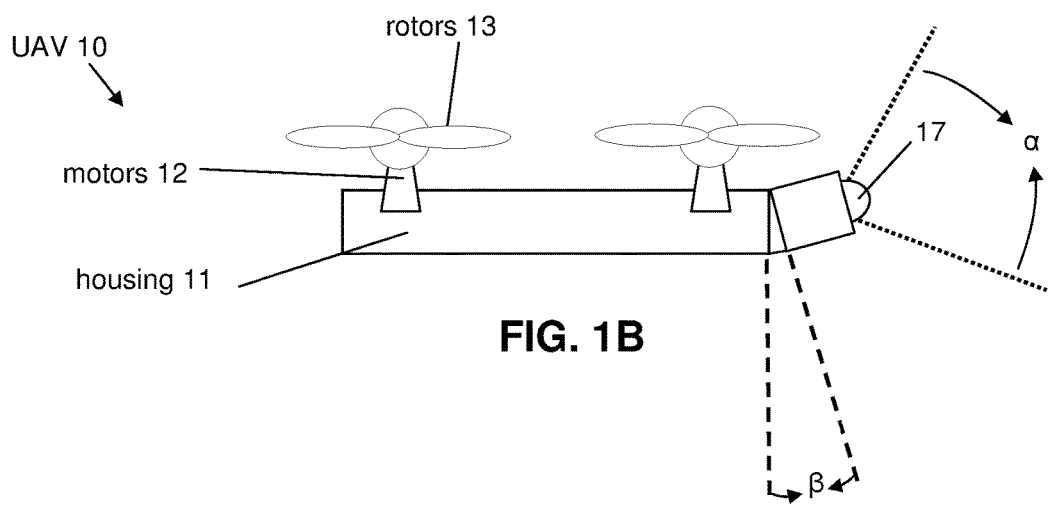
FIG. 1B schematically illustrates a side view of an unmanned aerial vehicle in accordance with one or more implementations.

FIGS. 1A and 1B schematically illustrate an unmanned aerial vehicle 10 (also referred to as UAV 10), in particular a quadcopter. The quadcopter is an exemplary and non-limiting implementation of UAV 10. As illustrated in FIGS. 1A and 1B, UAV 10 may include four motors 12 and four rotors 13. The number of motors and rotors of UAV 10 is not intended to be limited by any depiction. In some implementations, UAV 10 may include one, two, three, four, five, six, and/or more than six motors and/or rotors.

UAV 10 may include one or more of housing 11, motor 12, rotor 13, first image sensor 14, second image sensor 15, first optical element 16, second optical element 17, processor 18, electronic storage 19, active rotation mechanism 20, tilt sensor 30, and/or other components. Housing 11 may have a midline plane that runs through a middle of housing 11. The midline plane may be horizontal when UAV 10 operates leveled with respect to ground. The midline plane may be tilted when UAV 10 is tilted during flight. The tilt of the midline plane may be the tilt of UAV 10.

First optical element 16 may have a first field of view, and second optical element 17 may have a second field of view. First optical element 16 may be carried by housing 11 such that the vertical field of view of the first field of view above the midline plane of housing 11 is greater than the vertical field of view of the first field of view below the midline plane of housing 11 when UAV 10 is tilted during flight. Second optical element 17 may be carried by housing 11 such that the vertical field of view of the second field of view above the midline plane of housing 11 is greater than the vertical field of view of the second field of view below the midline plane of housing 11 when UAV 10 is tilted during flight, and such that a portion of the first field of view and a portion of the second field of view overlap.

First image sensor 14 may generate a first output signal conveying first visual information based on light guided to first image sensor 14 by first optical element 16, and second image sensor 15 may generate a second output signal conveying second visual information based on light guided to second image sensor 15 by second optical element 17. Processor 18 may receive the first output signal and the second output signal and determine a disparity of an object within the overlapping portions of the first field of view and the second field of view. Processor 18 may provide flight control for UAV 10 based on the disparity.

Housing 11 may be configured to attach to, support, hold, and/or carry components of UAV 10. The combination of housing 11 and components attached to, supported, held, and/or carried by housing 11 may be referred to as an unmanned aerial vehicle.

Motor 12 may be carried by housing 11. Rotor 13 may be driven by motor 12. In some implementations, rotor 13 may include a rotor blade, a hub, and a mast. The rotor blade may be connected to the hub, the hub may be connected to the mast, and the mast may be connected to motor 12. In some implementations, rotor 13 may include a rotor blade and a hub. The rotor blade may be connected to the hub, and the hub may be connected to motor 12.

Rotor 13 may provide thrust to move UAV 10 along any direction. In a three-dimensional Cartesian coordinate system, rotor 13 may provide thrust to move UAV 10 along the positive X-axis, the negative X-axis, the positive Y-axis, the negative Y-axis, the positive Z-axis, the negative Z-axis, and any combination thereof. Rotor 13 may provide thrust to rotate UAV 10 along pitch axis, roll axis, yaw axis, and any combination thereof. Rotor 13 may provide thrust to rotate and move UAV 10 at the same time.

First image sensor 14 may be carried within housing 11 and may be configured to generate a first output signal conveying first visual information based on light that becomes incident thereon. In some implementations, the first image sensor may include one or more of a charge-coupled device sensor, an active pixel sensor, a complementary metal-oxide semiconductor sensor, an N-type metal-oxide-semiconductor sensor, and/or other image sensors.

Second image sensor 15 may be carried within housing 11 and may be configured to generate a second output signal conveying second visual information based on light that becomes incident thereon. In some implementations, the second image sensor may include one or more of a charge-coupled device sensor, an active pixel sensor, a complementary metal-oxide semiconductor sensor, an N-type metal-oxide-semiconductor sensor, and/or other image sensors.

The first visual information may include, by way of non-limiting example, one or more of an image, a video, and/or other visual information. The second visual information may include, by way of non-limiting example, one or more of an image, a video, and/or other visual information. One or more of the first visual information and/or the second visual information may be marked, timestamped, annotated, stored, and/or otherwise processed.

First optical element 16 may be configured to guide light within a first field of view to first image sensor 14. While an object is within the first field of view of first optical element 16, first visual information generated by first image sensor 14 includes the object. Second optical element 17 may be configured to guide light within a second field of view to second image sensor 15. While an object is within the second field of view of second optical element 17, second visual information generated by second image sensor 15 includes the object.

First optical element 16 may guide light received from an object to first image sensor 14 directly or indirectly through use of one or more light manipulating components. Second optical element 17 may guide light received from an object to second image sensor 15 directly or indirectly through use of one or more light manipulating components. By way of non-limiting example, a light manipulating components may include one or more of a mirror, a prism, lenses, and/or other light manipulating components.

In some implementations, first optical element 16 may include one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens, a perspective control lens, and/or other optical elements. In some implementations, second optical element 17 may include one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens, a perspective control lens, and/or other optical elements.

First optical element 16 may be carried by housing 11. First optical element 16 may be carried by housing 11 such that the vertical field of view of the first field of view above the midline plane of housing 11 is greater than the vertical field of view of the first field of view below the midline plane of housing 11 when UAV 10 is tilted during flight. Second optical element 17 may be carried by housing 11. Second optical element 17 may be carried by housing 11 such that the vertical field of view of the second field of view above the midline plane of housing 11 is greater than the vertical field of view of the second field of view below the midline plane of housing 11 when UAV 10 is tilted during flight, and such that a portion of the first field of view and a portion of the second field of view overlap.

In some implementations, one or more of first image sensor 14, second image sensor 15, first optical element 16, and/or second optical element 17 may be carried directly by housing 11. By way of non-limiting example, one or more of first image sensor 14, second image sensor 15, first optical element 16, and/or second optical element 17 may be in physical contact with housing 11 and may be directly attached to housing 11, directly supported by housing 11, directly held by housing 11, and/or otherwise directly carried by housing 11.

In some implementations, one or more of first image sensor 14, second image sensor 15, first optical element 16, and/or second optical element 17 may be carried indirectly by housing 11. By way of non-limiting example, one or more of first image sensor 14, second image sensor 15, first optical element 16, and/or second optical element 17 may not be in physical contact with housing 11 and may be indirectly attached to housing 11, indirectly supported by housing 11, indirectly held by housing 11, and/or otherwise indirectly carried by housing 11. For example, one or more of first image sensor 14, second image sensor 15, first optical element 16, and/or second optical element 17 may be located in a container, and the container may be directly carried by housing 11

FIG. 1B schematically illustrates a side view of UAV 10 in accordance with one or more implementations. In FIG. 1B, the vertical field of view of the first field of view of first optical element 16 and the vertical field of view of the second field of view of second optical element 17 have the same angle, shown as angle alpha ($\alpha$). The portion of housing 11 that carries first optical element 16 and second optical element 17 is tilted up by angle beta ($\beta$).

Figure 2A:
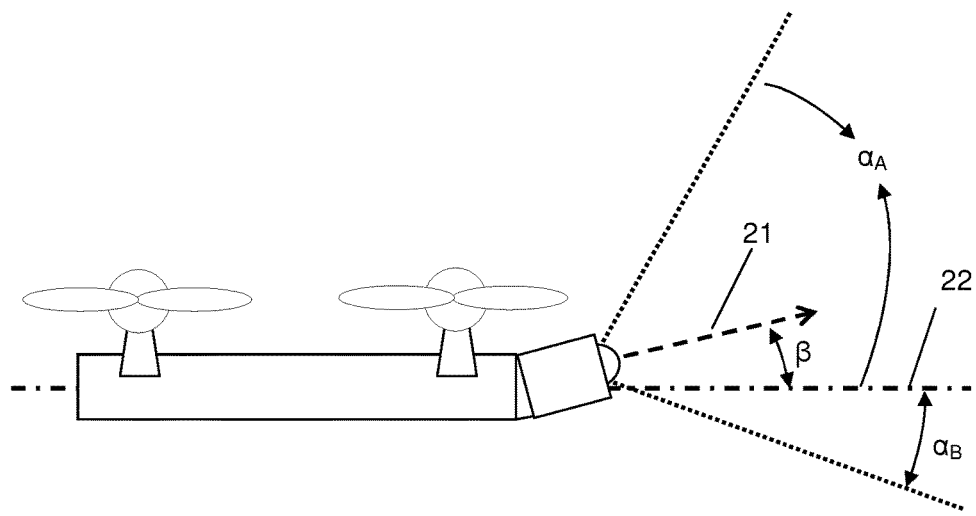
FIG. 2A schematically illustrates a side view of an unmanned aerial vehicle operating leveled with respect to ground in accordance with one or more implementations.

FIG. 2A schematically illustrates a side view of UAV 10 operating leveled with respect to ground. In FIG. 2A, the centerline of the first field of view and the centerline of the second field of view are both shown as centerline 21 (dashed line). The midline plane of housing 11 is shown as midline plane 22 (dot-dashed line). When UAV 10 is operating leveled with respect to ground, midline plane 22 is horizontal and centerline 21 is tilted up by angle $\beta$ from midline plane 22. The angle of the vertical field of view of the first field of view above midline plane 22 and the angle of the vertical field of view of the second field of view above midline plane 22, shown as $\alpha_A$, are equal to one half of angle $\alpha$ plus angle $\beta$ (angle above the midline plane=$\alpha/2+\beta$). The angle of the vertical field of view of the first field of view below midline plane 22 and the angle of the vertical field of view of the second field of view below midline plane 22, shown as $\alpha_B$, are equal to one half of angle $\alpha$ minus angle $\beta$ (angle below the midline plane=$\alpha/2-\beta$).

Figure 2B:
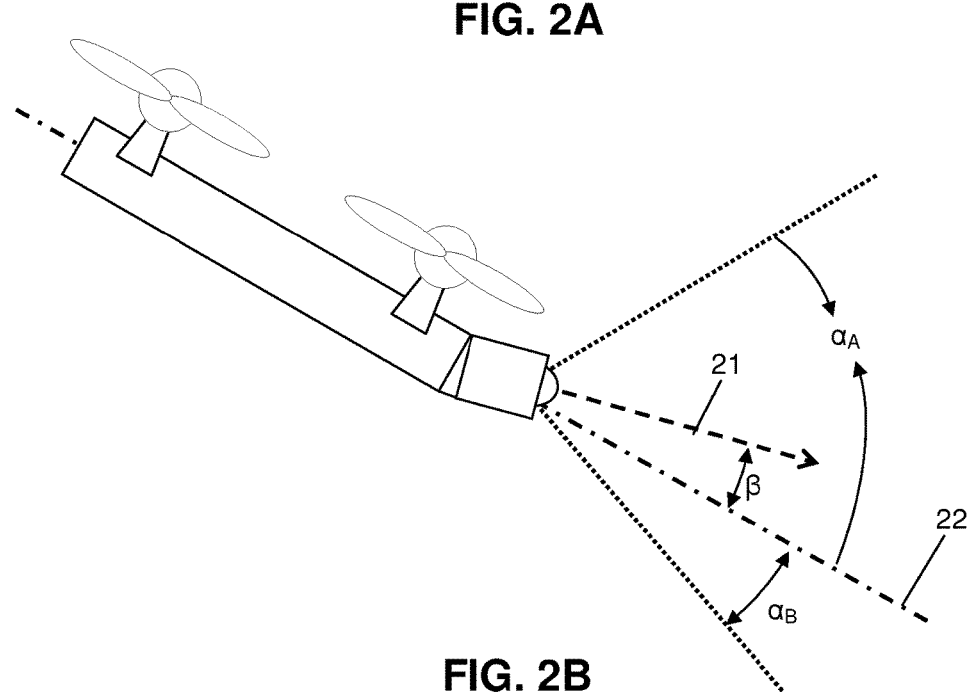
FIG. 2B schematically illustrates a side view of an unmanned aerial vehicle operating tilted with respect to ground in accordance with one or more implementations.

FIG. 2B schematically illustrates a side view of UAV 10 operating tilted with respect to ground. For example, UAV 10 may be tilted when UAV 10 is moving forward. Tilt of UAV 10 based on other types of operation of UAV 10 is contemplated. The vertical angle of the first and second fields of view above midline plane 22, shown as $\alpha_A$, are equal to one half of angle $\alpha$ plus angle $\beta$ (angle above the midline plane=$\alpha/2+\beta$) and include a significant view of the path in front of UAV 10.

Exemplary arrangement of housing 11, first optical element 16, and second optical element 17 shown in FIGS. 1A, 1B, 2A, and 2B is not meant to be limiting. In some implementations, first optical element 16 and second optical element 17 may be affixed to housing 11. For example, the first field of view of first optical element 16 and the second field of view of second optical element 17 may be static with respect to housing 11, i.e., the first field of view of first optical element 16 and the second field of view of second optical element 17 do not change with respect to housing 11 during operation of UAV 10. Rather, the first field of view of first optical element 16 and the second field of view of second optical element 17 may be dependent on the orientation of housing 11.

In some implementations, the tilt of first optical element 16 and the tilt of second optical element 17 may change during operation of UAV 10. For example, the first field of view of first optical element 16 and the second field of view of second optical element 17 may be dynamic with respect to housing 11, i.e., the field of view of first optical element 16 and the field of view of second optical element 17 may change with respect to housing 11 during operation of UAV 10. The first field of view of first optical element 16 may be dependent on the orientation of housing 11 and on the tilt of first optical element 16, and the second field of view of second optical element 17 may be dependent on the orientation of housing 11 and on the tilt of second optical element 17. In some implementations, first optical element 16 and second optical element 17 may be tilted during operation of UAV 10 by use of active rotation mechanism 20, such as a servo motor, as described below. In some implementations, active rotation mechanism 20 may be used to individually tilt first optical element 16 and/or second optical element 17. In some implementations, active rotation mechanism 20 may be used to tilt first optical element 16 and second optical element 17 together. In some implementations, active rotation mechanism 20 may be used to directly tilt first optical element 16 and/or second optical element 17. In some implementations, active rotation mechanism 20 may be used to indirectly tilt first optical element 16 and/or second optical element 17 by tilting a portion of housing 11 carrying first optical element 16 and/or second optical element 17, or another component (for example, a container) carrying first optical element 16 and/or second optical element 17.

The above described arrangement of first optical element 16 and second optical element 17 may allow for parallax disparity detection of an object within the overlapping portions of the first field of view of first optical element 16 and the second field of view of second optical element 17. Distance between the object and UAV 10 may be determined based on the parallax disparity.

Parallax refers to the seeming change in position of an object because of a change in the observer's viewpoint. Parallax disparity is the change in position of an object between two viewpoints. Parallax disparity is inversely proportional to the distance from the viewpoints to the object. Parallax disparity of an object and/or distance between an object and UAV 10 may be determined as described in U.S. patent application Ser. No. 14/949,798, entitled "UNMANNED AERIAL VEHICLE WITH PARALLAX DISPARITY DETECTION OFFSET FROM HORIZONTAL," filed Nov. 23, 2015, the foregoing being incorporated herein by reference in its entirety.

Electronic storage 19 may include electronic storage media that electronically stores information. Electronic storage 19 may store software algorithms, information determined by processor 18, information received remotely, and/or other information that enables UAV 10 to function properly. For example, electronic storage 19 may store visual information (as discussed elsewhere herein), and/or other information.

Processor 18 may be configured to provide information processing capabilities in UAV 10. Processor 18 may include one or more of a digital processor, an analog processor, a digital circuit designed to process information, a central processing unit, a graphics processing unit, a microcontroller, an analog circuit designed to process information, a state machine, and/or other mechanisms for electronically processing information. By way of non-limiting example, a microcontroller may be one or more of 8051, PIC, AVR, and ARM microcontroller. In some implementations, processor 18 may include a plurality of processing units. In some implementations, processor 18 may be coupled with one or more of RAM, ROM, input/output ports, and/or other peripherals.

Processor 18 may be coupled, directly or indirectly, to one or more flight control components. By way of non-limiting example, a flight control component may include one or more of an actuator, a motor, a rotor, an accelerometer, a rate of rotation sensor (e.g., a gyroscope), a tilt sensor, an inertial measurement unit, a compass, a magnetometer, a pressure sensor, a barometer, a global positioning system device, a distance sensor, an image sensor, an optical element, an electronic storage, and/or other flight control components.

Processor 18 may be configured by a computer-readable instruction to provide information-processing capability. Information-processing capability may include, but is not limited to, receiving a first output signal generated by first image sensor 14, receiving a second output signal generated by second image sensor 15, comparing first visual information conveyed within the first output signal with second visual information conveyed within the second output signal to determine parallax disparity of an object, and/or determining distance between the object and UAV 10 based on the parallax disparity. The object may be located within overlapping portions of a first field of view of first optical element 16 and a second field of view of second optical element 17. Comparing the first visual information with the second visual information to determine parallax disparity of the object may include one or more of distortion removal, image rectification, disparity map generation, and/or height map generation.

Information processing capability of processor 18 may include providing flight control for UAV 10 based on the disparity. By way of non-limiting example, flight control may include one or more of stabilization control, navigation control, altitude control, attitude control, position control, propulsion control, engine control, and/or other control needed and/or used during operation of unmanned aerial vehicles.

In some implementations, providing flight control for UAV 10 based on the disparity may include operating UAV 10 to maintain a minimum distance between the object and/or a maximum distance from the object. A minimum distance may refer to one or both of horizontal distance and/or vertical distance that UAV 10 must keep between UAV 10 and the object. For example, providing flight control for UAV 10 based on the disparity may include operating UAV 10 to avoid the object by maintaining a certain horizontal distance and/or a certain vertical distance from the object. A maximum distance may refer to one or both of horizontal distance and/or vertical distance from the object within which UAV 10 must stay. For example, providing flight control for UAV 10 based on the disparity may include operating UAV 10 to stay near or follow the object by staying within a certain horizontal distance and/or a certain vertical distance around the object. In some implementations, providing flight control for UAV 10 based on the disparity may include operating UAV 10A to maintain a set distance from the object by setting the same distance for the minimum distance and the maximum distance.

In some implementations, providing flight control for UAV 10 based on the disparity may include operating UAV 10 to maintain a minimum speed and/or a maximum speed. A minimum speed may refer to one or both of linear speed and/or angular speed that UAV 10 should not drop below. A maximum speed may refer to one or both of linear speed and/or angular speed that UAV 10 should not exceed. In some implementations, providing flight control for UAV 10 based on the disparity may include operating UAV 10A to maintain a set speed in the vicinity of the object by setting the same speed for the minimum speed and the maximum speed.

In some implementations, providing flight control for UAV 10 based on the disparity may include effectuating one or more operating behaviors of UAV 10. Operating behavior may refer to one or more motions and/or operations of UAV 10 and/or one or more components of UAV 10. Motion of UAV 10 and/or one or more components of UAV 10 may refer to motion of UAV 10/component(s) at a time, motion of UAV 10/component(s) over a period of time, motion of UAV 10/component(s) at a location, and/or motion of the UAV 10/component(s) over a distance. Operation of UAV 10 and/or one or more components of UAV 10 may refer to operation of UAV 10/component(s) at a time, operation of UAV 10/component(s) over a period of time, operation of UAV 10/component(s) at a location, and/or operation of UAV 10/component(s) over a distance.

In some implementations, information processing capability of processor 18 may include operating active rotation mechanism 20 to tilt first optical element 16 and second optical element 17 based on the tilt of UAV 10 during flight. Processor 18 may be directly or indirectly coupled to tilt sensor 30, which relays information regarding tilt of UAV 10. Based on the tilt of UAV 10 during flight, processor 18 may operate active rotation mechanism 20 to tilt first optical element 16 and second optical element 17 so that the vertical field of view of the first field of view above the midline plane of housing 11 is greater than the vertical field of view of the first field of view below the midline plane of housing 11 and the vertical field of view of the second field of view above the midline plane of housing 11 is greater than the vertical field of view of the second field of view below the midline plane of housing 11.

Processor 18 may be directly or indirectly coupled to active rotation mechanism 20. Processor 18 may operate active rotation mechanism 20 to individually tilt first optical element 16 and/or second optical element 17. Processor 18 may operate active rotation mechanism 20 to tilt first optical element 16 and second optical element 17 together. Processor 18 may operate active rotation mechanism 20 to directly tilt first optical element 16 and/or second optical element 17, or tilt a portion of housing 11 carrying first optical element 16 and/or second optical element 17 or another component (for example, a container) carrying first optical element 16 and/or second optical element 17.

In some implementations, computer-readable instructions may be stored in memory of processor 18. In some implementations, the computer-readable instructions may be stored in electronic storage 19. In some implementations, the computer-readable instruction may be received through remote communication, including, but not limited to, radio communication, Bluetooth communication, Wi-Fi communication, cellular communication, infrared communication, and/or other remote communication. In some implementations, processor 18 may use computer-readable instruction from one or more of memory of processor 18, electronic storage 19, and/or remote communication.

In some implementations, computer-readable instructions may include flight control instructions. Processor 18 may include flight control instructions in its memory to provide flight control. In some implementations, flight control instructions may be stored in electronic storage 19. In some implementations, flight control instructions may be received through remote communication, including, but not limited to, radio communication, Bluetooth communication, Wi-Fi communication, cellular communication, infrared communication, and/or other remote communication. By way of non-limiting example, flight control instructions include one or more of moving UAV 10 in any direction, rotating UAV 10 in any direction, flying UAV 10 in a stable manner, tracking people or objects, avoiding collisions, changing or maintaining linear speed of UAV 10, changing or maintaining angular speed of UAV 10, and/or other functions needed and/or used during operation of unmanned aerial vehicles.

In some implementations, flight control instructions may be stored in electronic storage 19. In some implementations, flight control instructions may be received through remote communication, including, but not limited to, radio communication, Bluetooth communication, Wi-Fi communication, cellular communication, infrared communication, and/or other remote communication. In some implementations, processor 18 may use flight control instructions from one or more of memory of processor 18, electronic storage 19, and/or remote communication.

Although all components of UAV 10 are shown to be located in UAV 10 in FIGS. 1A and 1B, some or all of the components may be installed in UAV 10 and/or be otherwise coupled with UAV 10. Any communication medium may be used to facilitate interaction between any components of UAV 10. One or more components of UAV 10 may communicate with each other through hard-wired communication, wireless communication, or both. Other types of communications are contemplated by the present disclosure. By way of non-limiting example, wireless communication may include one or more of radio communication, Bluetooth communication, Wi-Fi communication, cellular communication, infrared communication, or other wireless communication.

Although first image sensor 14 and second image sensor 15 are depicted in FIG. 1A as single elements, this is not intended to be limiting. One or both of first image sensor 14 and/or second image sensor 15 may include one or more image sensors in one or more locations on or in UAV 10. Although first optical element 16 and second optical element 17 are depicted in FIG. 1A as single elements, this is not intended to be limiting. One or both of first optical element 16 and/or second optical element 17 may include multiple actual components or pieces in one or more locations on or in UAV 10.

Although processor 18 is shown in FIG. 1A as a single entity, this is for illustrative purposes only. In some implementations, processor 18 may comprise a plurality of processing units. These processing units may be physically located within the same device, or processor 18 may represent processing functionality of a plurality of devices operating in coordination. Processor 18 may be configured to execute one or more computer-readable instructions by software; hardware; firmware; some combination of software, hardware, and/or firmware; and/or other mechanisms for configuring processing capabilities on processor 18.

Electronic storage 19 may include electronic storage media that electronically stores information. The electronic storage media of electronic storage 19 may be provided integrally (i.e., substantially non-removable) with UAV 10 and/or removable storage that is connectable to UAV 10 via, for example, a port (e.g., a USB port, a Firewire port, etc.) or a drive (e.g., a disk drive, etc.). Electronic storage 19 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 19 may be a separate component within UAV 10, or electronic storage 19 may be provided integrally with one or more other components of UAV 10 (e.g., processor 18). Although electronic storage 19 is shown in FIG. 1A as a single element, this is not intended to be limiting. In some implementations, electronic storage 19 may comprise a plurality of storage units. These storage units may be physically located within the same device, or electronic storage 19 may represent storage functionality of a plurality of devices operating in coordination.

Figure 3:
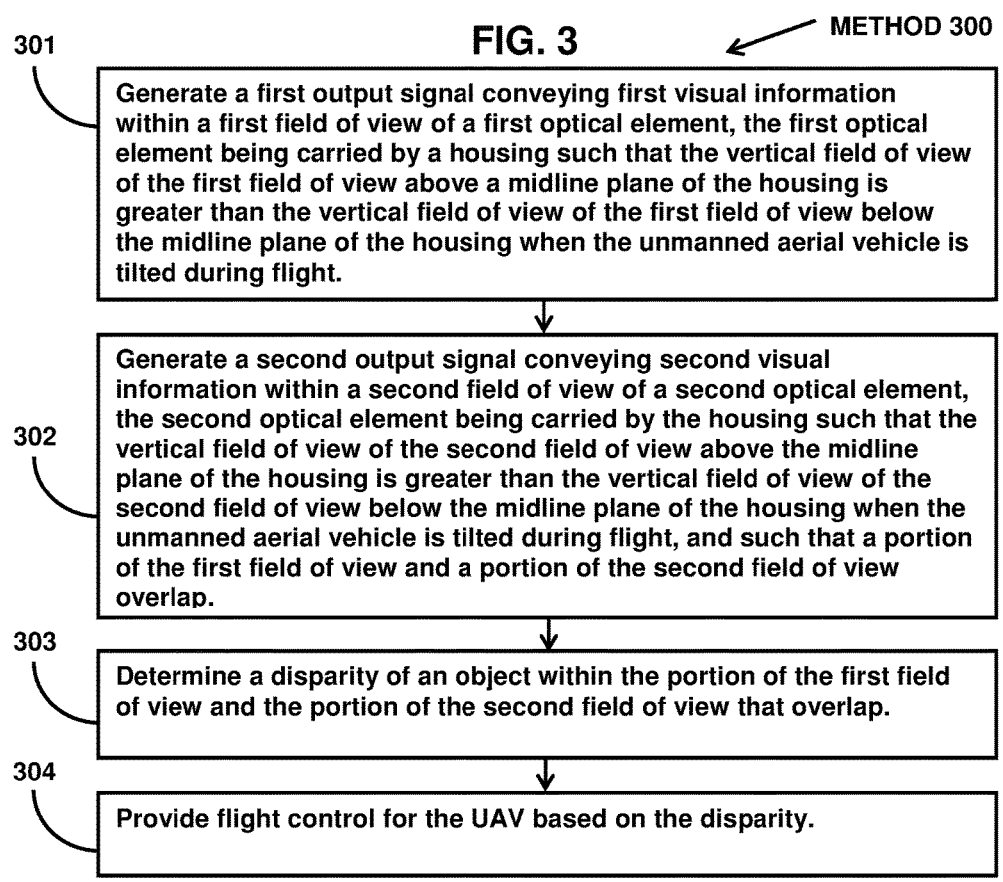
FIG. 3 illustrates a method to provide flight control for an unmanned aerial vehicle based on tilted optical elements.

FIG. 3 illustrates method 300 for providing flight control for an unmanned aerial vehicle based on tilted optical elements. The operations of method 300 presented below are intended to be illustrative. In some implementations, method 300 may be accomplished with one or more additional operations not described, and/or without one or more of the operations discussed. In some implementations, two or more of the operations may occur substantially simultaneously.

In some implementations, method 300 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 300 in response to instructions stored electronically on one or more electronic storage mediums. The one or more processing devices may include one or more devices configured through hardware, firmware, and/or software to be specifically designed for execution of one or more of the operations of method 300.

Referring to FIG. 3 and method 300, at operation 301, a first output signal conveying first visual information within a first field of view of a first optical element may be generated. The first visual information may include one or more of an image, a video, and/or other visual information. The first optical element may be carried by a housing of a UAV such that the vertical field of view of the first field of view above a midline plane of the housing is greater than the vertical field of view of the first field of view below the midline plane of the housing when the UAV is tilted during flight. The midline plane of the housing may run through a middle of the housing. The midline plane may be horizontal when the UAV operates leveled with respect to ground and may be tilted when the UAV is tilted during flight. The tilt of the midline plane may be the tilt of the UAV. In some implementations, operation 301 may be performed by one or more image sensors the same as or similar to first image sensor 14 (shown in FIG. 1B and described herein).

At operation 302, a second output signal conveying second visual information within a second field of view of a second optical element may be generated. The second visual information may include one or more of an image, a video, and/or other visual information. The second optical element may be carried by the housing of the UAV such that the vertical field of view of the second field of view above the midline plane of the housing is greater than the vertical field of view of the second field of view below the midline plane of the housing when the UAV is tilted during flight, and such that a portion of the first field of view and a portion of the second field of view overlap. In some implementations, operation 302 may be performed by one or more image sensors the same as or similar to second image sensor 15 (shown in FIG. 1B and described herein).

At operation 303, a disparity of an object within the overlapping portions of the first field of view and the second field of view may be determined. In some implementations, operation 303 may be performed by one or more processors the same as or similar to processor 18 (shown in FIG. 1A and described herein).

At operation 304, flight control based on the disparity may be provided for the UAV. In some implementations, operation 304 may be performed by one or more processors the same as or similar to processor 18 (shown in FIG. 1A and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An unmanned aerial vehicle comprising:
   a housing having a midline plane that runs through a middle of the housing, the midline plane being horizontal when the unmanned aerial vehicle operates leveled with respect to ground and being tilted when the unmanned aerial vehicle is tilted during flight, wherein the tilt of the midline plane is the tilt of the unmanned aerial vehicle;
   a motor carried by the housing, the motor configured to drive a rotor;
   a first image sensor carried within the housing and configured to generate a first output signal conveying first visual information based on light that becomes incident thereon;
   a second image sensor carried within the housing and configured to generate a second output signal conveying second visual information based on light that becomes incident thereon;
   a first optical element configured to guide light within a first field of view to the first image sensor, the first optical element being carried by the housing such that the vertical field of view of the first field of view above the midline plane of the housing is greater than the vertical field of view of the first field of view below the midline plane of the housing when the unmanned aerial vehicle is tilted during flight;
   a second optical element configured to guide light within a second field of view to the second image sensor, the second optical element being carried by the housing such that the vertical field of view of the second field of view above the midline plane of the housing is greater than the vertical field of view of the second field of view below the midline plane of the housing when the unmanned aerial vehicle is tilted during flight, and such that a portion of the first field of view and a portion of the second field of view overlap; and one or more processors carried by the housing, wherein the one or more processors are configured by machine readable instructions to:
- receive the first output signal and the second output signal;
- determine a disparity of an object within the portion of the first field of view and the portion of the second field of view that overlap; and
- provide flight control for the unmanned aerial vehicle based on the disparity, wherein providing flight control for the unmanned aerial vehicle includes operating the unmanned aerial vehicle to avoid the object.

2. The unmanned aerial vehicle of claim 1, further comprising:
- an active rotation mechanism configured to tilt the first optical element and the second optical element; and
- wherein the one or more processors are further configured by machine readable instructions to operate the active rotation mechanism to tilt the first optical element and the second optical element based on the tilt of the unmanned aerial vehicle during flight.

3. The unmanned aerial vehicle of claim 1, wherein the first optical element and the second optical element are affixed to the housing.

4. The unmanned aerial vehicle of claim 1, wherein providing flight control for the unmanned aerial vehicle based on the disparity includes operating the unmanned aerial vehicle to maintain a minimum distance between the object and/or a maximum distance from the object.

5. The unmanned aerial vehicle of claim 1, wherein providing flight control for the unmanned aerial vehicle based on the disparity includes operating the unmanned aerial vehicle to maintain a minimum speed and/or a maximum speed.

6. The unmanned aerial vehicle of claim 1, wherein the first image sensor includes one or more of a charge-coupled device sensor, an active pixel sensor, a complementary metal-oxide semiconductor sensor and/or an N-type metal-oxide-semiconductor sensor.

7. The unmanned aerial vehicle of claim 1, wherein the second image sensor includes one or more of a charge-coupled device sensor, an active pixel sensor, a complementary metal-oxide semiconductor sensor and/or an N-type metal-oxide-semiconductor sensor.

8. The unmanned aerial vehicle of claim 1, wherein the first optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

9. The unmanned aerial vehicle of claim 1, wherein the second optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

10. A method for providing flight control for an unmanned aerial vehicle, the method comprising:
- generating a first output signal conveying first visual information within a first field of view of a first optical element, the first optical element being carried by a housing such that the vertical field of view of the first field of view above a midline plane of the housing is greater than the vertical field of view of the first field of view below the midline plane of the housing when the unmanned aerial vehicle is tilted during flight;
- generating a second output signal conveying second visual within a second field of view of a second optical element, the second optical element being carried by the housing such that the vertical field of view of the second field of view above the midline plane of the housing is greater than the vertical field of view of the second field of view below the midline plane of the housing when the unmanned aerial vehicle is tilted during flight, and such that a portion of the first field of view and a portion of the second field of view overlap;
- determining a disparity of an object within the portion of the first field of view and the portion of the second field of view that overlap; and
- providing flight control for the unmanned aerial vehicle based on the disparity, wherein providing flight control for the unmanned aerial vehicle includes operating the unmanned aerial vehicle to avoid the object.

11. The method of claim 10, wherein the first optical element and the second optical element are affixed to the housing.

12. The method of claim 10, further comprising tilting the first optical element and the second optical element based on the tilt of the unmanned aerial vehicle during flight.

13. The method of claim 10, wherein providing flight control for the unmanned aerial vehicle based on the disparity includes operating the unmanned aerial vehicle to maintain a minimum distance between the object and/or a maximum distance from the object.

14. The method of claim 10, wherein providing flight control for the unmanned aerial vehicle based on the disparity includes operating the unmanned aerial vehicle to maintain a minimum speed and/or a maximum speed.

15. The method of claim 10, wherein the first image sensor includes one or more of a charge-coupled device sensor, an active pixel sensor, a complementary metal-oxide semiconductor sensor and/or an N-type metal-oxide-semiconductor sensor.

16. The method of claim 10, wherein the second image sensor includes one or more of a charge-coupled device sensor, an active pixel sensor, a complementary metal-oxide semiconductor sensor and/or an N-type metal-oxide-semiconductor sensor.

17. The method of claim 10, wherein the first optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

18. The method of claim 10, wherein the second optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

\* \* \* \* \*